United States Patent
Wang et al.

(10) Patent No.: US 11,477,729 B2
(45) Date of Patent: Oct. 18, 2022

(54) CELL SELECTION OR ACCESS METHOD, A USER TERMINAL, A MAINTENANCE METHOD, AND A BASE STATION

(71) Applicant: NTT DOCOMO, INC., Tokyo (JP)

(72) Inventors: Jing Wang, Beijing (CN); Hanning Wang, Beijing (CN); Liu Liu, Beijing (CN); Wuri A. Hapsari, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/648,911

(22) PCT Filed: Jul. 25, 2018

(86) PCT No.: PCT/CN2018/097015
§ 371 (c)(1),
(2) Date: Mar. 19, 2020

(87) PCT Pub. No.: WO2019/062307
PCT Pub. Date: Apr. 4, 2019

(65) Prior Publication Data
US 2020/0288390 A1   Sep. 10, 2020

(30) Foreign Application Priority Data
Sep. 26, 2017  (CN) .......................... 201710882885.6

(51) Int. Cl.
*H04B 7/185* (2006.01)
*H04W 48/20* (2009.01)
*H04W 48/10* (2009.01)

(52) U.S. Cl.
CPC ........ *H04W 48/20* (2013.01); *H04B 7/18506* (2013.01); *H04W 48/10* (2013.01)

(58) Field of Classification Search
CPC ............... H04B 7/185; H04B 7/18506; H04W 36/00835; H04W 48/10; H04W 48/20
See application file for complete search history.

(56) References Cited

U.S. PATENT DOCUMENTS 10,074,284 B1 *   9/2018   Priest ...................... G05D 1/106
2021/0144626 A1 *  5/2021   Han ........................ H04W 48/12

FOREIGN PATENT DOCUMENTS

| CN | 101646223 A | 2/2010 |
|----|-------------|--------|
| CN | 101784066 A | 7/2010 |

(Continued)

OTHER PUBLICATIONS

International Search Report issued in the counterpart Chinese Patent Application No. PCT/CN2018/097015, dated Oct. 18, 2018 (5 pages).

(Continued)

*Primary Examiner* — Minh Trang T Nguyen
(74) *Attorney, Agent, or Firm* — Osha Bergman Watanabe & Burton LLP

(57) ABSTRACT

Provided are a cell selection or access method performed by an aerial user terminal, an aerial user terminal, a neighbor relationship table maintaining method performed by a base station, and a base station. The cell selection or access method includes: receiving, from a base station, indication information for indicating support capability of at least one cell for aerial user terminals; and according to the indication information, selectively performing cell selection or access for one cell of the at least one cell. The maintaining method includes: receiving indication information indicating neighbor cells reported by a user terminal; and maintaining, according to whether the user terminal is an aerial user terminal, a neighbor relationship table selectively according to the indication information.

14 Claims, 5 Drawing Sheets

(56) References Cited

FOREIGN PATENT DOCUMENTS

| CN | 106355860 A | 1/2017 |
|---|---|---|
| CN | 106537823 A | 3/2017 |
| CN | 106688272 A | 5/2017 |
| CN | 111034271 A | 4/2020 |

OTHER PUBLICATIONS

Kyocera "Considerations for cell selection and reselection with UAVs", 3GPP TSG-RAN WG2#99, R2-1709520, Aug. 21-25, 2017, Berlin, Germany (2 pages).
First Office Action issued in Chinese Application No. 201880061660.7 dated Oct. 11, 2021 (16 pages).
Huawei, HiSilicon; "Potential enhancements for drones in idle state"; 3GPP TSG-RAN WG2 Meeting #99, R2-1708542; Berlin, Germany; Aug. 21-25, 2017 (3 pages).
3GPP TR 36.777 V0.3.0; "3rd Generation Partnership Project; Technical Specification Group Radio Access Network; Study on Enhanced LTE Support for Aerial Vehicles (Release 15)"; Sep. 2017 (23 pages).
Supplemental Search Report issued in corresponding Chinese application 201880061660.7 dated Apr. 26, 2022 (1 page).

\* cited by examiner

CELL SELECTION OR ACCESS METHOD, A USER TERMINAL, A MAINTENANCE METHOD, AND A BASE STATION

This application is a 371 U.S. National Phase of International Application No. PCT/CN2018/097015, filed on Jul. 25, 2018, which claims priority to Chinese Application No. 201710882885.6, filed on Sep. 26, 2017. The entire disclosures of the above applications are incorporated herein by reference.

TECHNICAL FIELD

The present disclosure relates to a field of mobile communication, and in particular, to an aerial user terminal (such as a drone), a cell selection or access method that may be used for the aerial user terminal, a base station, and a Neighbor Relationship Table (NRT) maintaining method that may be performed by the base station.

BACKGROUND

In recent years, drones or aerials or Unmanned Aerial Vehicles (UAVs) have been widely used, and wireless communication networks such as Long Term Evolution (LTE) networks may be used to support drone services, for example, communicate with drones during drone flight, or support terrestrial controllers/personnel to communicate with drones over wireless networks, due to their good coverage performance. Here, a user terminal such as a drone that is capable of flying in the air and capable of communicating with a base station through wireless communication networks may be referred to as an aerial user terminal.

Aerial user terminals have different characteristics compared with ground user terminals. First, the aerial user terminals are subject to more restrictions, such as flight restrictions, including altitude restrictions, speed restrictions, and/or whether or not flying is allowed, and the restrictions are different in different regions. In addition, compared to ground user terminals, the aerial user terminals have higher mobility due to their speed and altitude. Moreover, during takeoff and flight, the altitude of the aerial user terminal often changes, and thus the aerial user terminals face variable wireless propagation conditions. Therefore, compared with the ground user terminals, the aerial user terminals will be in a more complicated wireless environment. Moreover, the aerial user terminals may bring stronger interference to the wireless communication networks because of being in the air. The above characteristics of the aerial user terminals pose new challenges to its communication with the base station.

Therefore, the aerial user terminals and/or the wireless communication networks need to be enhanced in order to achieve better communication performance between the aerial user terminals and the wireless communication networks, while avoiding introducing new problems, and avoiding uplink and downlink interference for traditional ground users.

SUMMARY OF THE INVENTION

According to one embodiment of the present disclosure, there is provided a cell selection or access method performed by an aerial user terminal, including: receiving, from a base station, indication information indicating support capability of at least one cell for aerial user terminals; performing cell selection or access for one of the at least one cell selectively according to the indication information.

According to another embodiment of the present disclosure, there is provided an aerial user terminal, including: a receiving unit configured to receive, from a base station, indication information indicating support capability of at least one cell for aerial user terminals; a cell selecting/accessing unit configured to selectively perform cell selection or access for one of the at least one cell according to the indication information.

According to another embodiment of the present disclosure, there is provided a neighbor relationship table maintaining method performed by a base station, including: receiving indication information indicating neighbor cells reported by a user terminal; maintaining, according to whether the user terminal is an aerial user terminal, a neighbor relationship table selectively according to the indication information.

According to another embodiment of the present disclosure, there is provided a base station, including: a receiving unit configured to receive indication information indicating neighbor cells reported by a user terminal; a maintaining unit configured to selectively maintain, according to whether the user terminal is an aerial user terminal, the neighbor relationship table according to the indication information.

BRIEF DESCRIPTION OF THE DRAWINGS

The above and other objects, features and advantages of the present disclosure will become more apparent by describing embodiments of the present disclosure in more details with reference to accompanying drawings. The accompanying drawings are intended to provide a further understanding of the embodiments of the present disclosure, and constitute a part of the specification. The accompanying drawings are used to explain the present disclosure together with the embodiments of the present disclosure, and do not constitute a limitation on the present disclosure. In the accompanying drawings, the same reference numerals generally represent the same components or steps.

DESCRIPTION OF THE EMBODIMENTS

In order to make the objects, the technical solutions and the advantages of the present invention more apparent, exemplary embodiments according to the present disclosure will be described in detail below with reference to the accompanying drawings.

First, a wireless communication system in which embodiments of the present disclosure may be applied will be described with reference to FIG. 1. The wireless communication system may be LTE wireless communication system or any other type of wireless communication system. In the following, the embodiments of the present disclosure are described by taking LTE network as an example, but it should be recognized that the following description is also applicable to other types of wireless communication networks.

Figure 1:
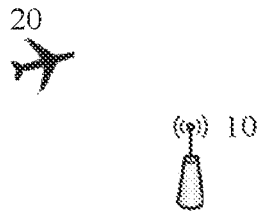
FIG. 1 is a schematic diagram of a wireless communication system in which embodiments of the present disclosure may be applied.

As shown in FIG. 1, a wireless communication system includes a base station (BS) 10 and a user equipment (UE) 20. The base station 10 may manage one or more cells, and as described below, may maintain a Neighbor Relationship Table (NRT) for each cell managed by the base station. The user equipment 20 may be an Aerial Vehicle (AV) capable of flying in the air and capable of communicating with the base station 10, for example a drone or a UAV (for example, a drone or a UAV based on a 3GPP specification Rel. 15). Here, a user equipment or user terminal capable of flying in the air and capable of performing wireless communication with the base station is referred to as an aerial user terminal (UT), which may also be interchangeably referred to as an aerial user equipment, an air user terminal, an air user equipment, or the like. It should be recognized that although one base station and one aerial user terminal are shown in FIG. 1, this is merely illustrative, and the wireless communication system may include a plurality of base stations and/or a plurality of aerial user terminals. Accordingly, the wireless communication system may include a plurality of cells. In addition, the wireless communication system may also include one or more user equipments or terminals (not shown) that are not aerial user terminals, that is, ground user equipments or terminals. In addition, in the following, cells and base stations are sometimes used interchangeably.

Among the plurality of cells of the wireless communication system, some cells support aerial user terminals. An aerial user terminal may perform cell selection on such cells to reside on or access to such cells and obtain good communication performance. Some other cells do not support aerial user terminals. If aerial user terminals reside on or access to such cells, the aerial user terminals may be difficult to obtain good communication performance and may cause unnecessary interference to other base stations/cells/user equipments since such cells cannot be optimized according to characteristics of the aerial user terminals. In addition, as described above, compared with ground user terminals, aerial user terminals are subject to various restrictions, such as flight restrictions, transmission power restrictions, and the like. If information on these restrictions is not notified to the aerial user terminals, it cannot be ensured that the aerial user terminals adhere to these restrictions, thereby resulting in security issues.

In the embodiments of the present disclosure, it is possible to indicate to the aerial user terminals which base station(s) or cell(s) supports the aerial user terminals, and to notify the aerial user terminals of configuration information related to the aerial user terminals, so as to optimize the communication between the aerial user terminals and the base station/cell and avoid the security issues described above.

Hereinafter, a cell selection or access method according to the embodiments of the present disclosure will be described with reference to FIG. 2, and the method may be performed by the aerial user terminal 20. Specifically, when the aerial user terminal 20 is in an idle state, it may perform cell selection/reselection with the method, thereby reside on the cell, and when the aerial user terminal 20 is in a connected state, it may perform cell access with the method.

Figure 2:
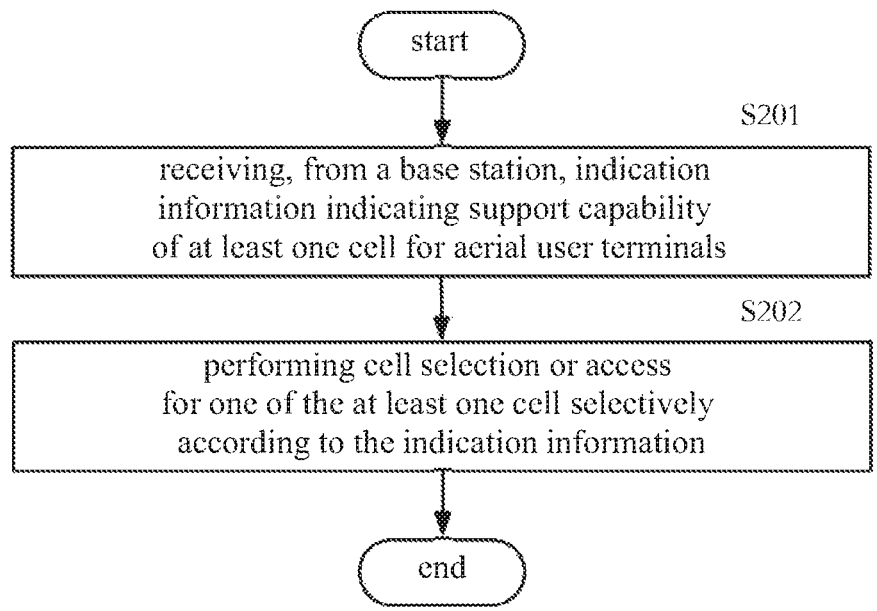
FIG. 2 is a flowchart of a cell selection or access method performed by an aerial user terminal according to a first embodiment of the present disclosure.

As shown in FIG. 2, in step S201, the aerial user terminal 20 may receive, from the base station 10, indication information indicating a support capability of at least one cell for aerial user terminals. Then, in step S202, the aerial user terminal 20 may selectively perform selection or access for one of the at least one cell selectively according to the indication information.

In a first implementation, the at least one cell is a cell managed by the base station 10 itself. That is, the base station 10 may transmit to the aerial user terminal 20 the indication information indicating the support capability of the cell managed by the base station 10 itself for aerial user terminals (any aerial user terminals), that is, the indication information indicating whether or not the cell managed by the base station 10 supports aerial user terminals. Here, the cell supporting aerial user terminals may be, for example, a cell that allows aerial user terminals to select or access to and/or may be optimized for aerial user terminals.

In the implementation, the base station 10 may broadcast the indication information indicating whether or not the cell managed by the base station 10 supports aerial user terminals to part or all user terminals (including ground user terminals and/or aerial user terminals) in the cell managed by the base station 10 through a broadcast channel. information. For example, 1 bit may be set in the broadcast channel as the indication information to indicate whether a certain cell managed by the base station 10 supports aerial user terminals. For example, a first value (for example, 1) of the bit indicates that the cell supports aerial user terminals, and a second value (for example, 0) of the bit indicates that the cell does not support aerial user terminals. Accordingly, in step S201, the aerial user terminal 20 may receive the indication information from the base station 10. Then, the aerial user terminal 20 may determine whether the cell managed by the base station 10 supports aerial user terminals according to the indication information. If the cell managed by the base station 10 supports aerial user terminals, then in step S202, if the aerial user terminal 20 is in the idle state, the aerial user terminal 20 may select the cell to reside on the cell, or if the aerial user terminal 20 is in the connected state, the aerial user terminal 20 may access to the cell. Conversely, if the base station 10 does not support aerial user terminals, the aerial user terminal 20 does not select or access to the base station 10 in step S202. That is, the aerial user terminal 20 may only reside on or access to the cell supporting aerial user terminals.

In the implementation, the base station 10 may also transmit configuration information related to aerial user terminals to the aerial user terminal. Accordingly, the aerial user terminal 20 may receive the configuration information and perform corresponding operations and configurations according to the configuration information to control its own flight and/or communication with the wireless communication network. The configuration information may include flight restriction information, for example, information on restrictions on the flying altitude and/or the flying speed of the aerial user terminal. When receiving such configuration information, the aerial user terminal 20 may set the flying altitude and/or speed according to the flight restriction information. The configuration information may also include other types of restriction information, for example, information on restrictions on the transmission power of the aerial user terminal. When receiving such configuration information, the aerial user terminal 20 may set its own transmission power according to the restriction information, thereby reducing interference to the base station or other user equipment. The configuration information may further include a list of cells supporting aerial user terminals that may be used for Radio Resource Management (RRM) measurement of intra-frequency cell reselection or handover. When receiving such configuration information, the aerial user terminal 20 may perform RRM measurement on the cells in the list to perform intra-frequency cell reselection or handover. The configuration information may also include available frequencies that may be used for RRM measurement of inter-frequency cell reselection or handover, and a list of cells that support aerial user terminals on each frequency. When receiving such configuration information, the aerial user terminal 20 may perform inter-frequency RRM measurement on the corresponding frequencies and cells according to the frequencies and the cell list to perform inter-frequency cell reselection or handover. The configuration information may further include one or more communication parameters optimized for the aerial user terminal, for example, a TimeToTrigger optimized for the aerial user terminal, and the like. When receiving such configuration information, the aerial user terminal 20 may make corresponding settings according to the optimized communication parameters to optimize its communication with the base station, thereby obtaining good communication performance. The flight restriction information, power restriction information, optimized communication parameters, and the like. may be set for geographical areas, or may be set for one or more of a frequency, a frequency band, a cell, and a cell list, and the like. It should be recognized that, in addition to the above configuration information, the base station may also transmit other configuration information, so that the aerial user terminal receives the configuration information, and performs corresponding operations and configurations according to the configuration information. In addition, although the above cell list is the list of cells that support aerial user terminals in all cells, that is, it does not include cells that do not support aerial user terminals, this is not restrictive and the above cell list may be all cells in the wireless communication network, where identifiers are set for the cells supporting aerial user terminals to distinguish them from the cells not supporting aerial user terminals, so that the aerial terminals may identify the cells supporting aerial user terminals according to the identifiers.

In the implementation, the base station 10 may transmit the above configuration information through system information. Accordingly, the aerial user terminal 20 may receive the configuration information by receiving the system information.

In one example, the base station 10 may transmit the configuration information by using one or more of the existing System Information Blocks (SIBs). Accordingly, the aerial user terminal 20 may receive the configuration information by receiving the one or more SIBs. For example, in the LTE system, SIB1 to SIB13 have been defined to transmit various system information. The base station 10 may additionally transmit the configuration information by using any one or more of these existing SIBs. Alternatively, the base station 10 may additionally transmit the above configuration information by using the SIBs for transmitting information similar to the above configuration information. Specifically, the existing SIB1 is used to transmit scheduling information for other SIBs and common information for cell access, and the existing SIB3 is used to transmit cell reselection information common for cell reselection of the intra-frequency, inter-frequency, or different Radio Access Technologies (RAT), the existing SIB4 is used to transmit related information on neighbor cells dedicated to intra-frequency cell reselection, and the existing SIB5 is used to transmit related information for inter-frequency cell reselection, that is, frequencies about inter-frequency cell reselection and information on neighbor cells on each frequency. Accordingly, the existing SIB1 may be modified, so that in addition to being used to transmit legacy information, the SIB1 may also be used to transmit related information common for aerial user terminals, for example, the above flight restriction information, power restriction information and/or optimized communication parameters. Alternatively, the existing SIB3 may be modified, so that in addition to being used to transmit legacy information, the SIB3 may also be used to transmit related information common for neighboring cells for intra-frequency or inter-frequency RRM measurement, for example, the above flight restriction information, power restriction information and/or optimized communication parameters. Alternatively, the existing SIB4 may be modified, so that in addition to being used to transmit legacy information, the SIB4 may also be used to transmit the related information dedicated to the neighbor cells for the intra-frequency RRM measurement, for example, the above list of cells that may be used for RRM measurement of intra-frequency cell reselection or handover and support aerial user terminals. Alternatively, the existing SIB5 may be modified, so that in addition to being used to transmit legacy information, the SIB5 may also be used to transmit the related information dedicated to the cells for inter-frequency RRM measurement, for example, the available frequencies that may be used for RRM measurement of inter-frequency cell reselection or handover, and the list of cells that support aerial user terminals on each frequency.

In another example, the base station 10 may define one or more new SIBs in addition to the existing SIBs to transmit the configuration information, so that the aerial user terminal 20 may receive the configuration information by receiving the one or more newly defined SIBs. The new SIBs may be received only by aerial user terminals, and the traditional ground users may not receive the new SIBs.

In another example, if the aerial user terminal 20 is in the connected (RRC Connected) state, the base station may transmit one or more pieces of the above configuration information through Radio Resource Control (RRC) signaling. Accordingly, the aerial user terminal 20 may receive the configuration information by receiving the RRC signaling. Alternatively, in this example, the base station may also use the system information and the RRC signaling in combination to transmit the configuration information. Accordingly, the aerial user terminal 20 may receive the configuration information by receiving a combination of the system information and the RRC signaling.

In a second implementation, the at least one cell is the cell managed by the base station 10 itself. That is, the base station 10 may transmit to the aerial user terminal 20 the indication information indicating the support capability of the cell managed by the base station 10 itself for aerial user terminals (any aerial user terminals).

Different from the first implementation, in the second implementation, the base station 10 may transmit or broadcast to the aerial user terminal 20 the indication information of the support capability of the cell managed by the base station 10 for aerial user terminals through the system information.

Specifically, in the LTE system, the base station broadcasts to the user terminals in the cell through SIB1, information indicating whether the cell managed by the base station allows the user terminals to reside on/perform cell selection/perform cell reselection and which user terminals are allowed to reside on/perform cell selection/perform cell reselection, as shown in Table 1 below.

TABLE 1

|  | | cellBarred | |
| --- | --- | --- | --- |
|  | | Barred | Not barred |
| cellReservedForOperatorUse | Reserved | Not allowed | Candidate cells for UEs with access class of 11 or 15 |
|  | Not reserved |  | Candidate cells |

In Table 1 above, "cellBarred" indicates whether the cell managed by the base station allow the user terminals to reside on/perform cell selection/perform cell reselection. If the value of "cellBarred" is "barred", the cell does not allow the user terminals to reside on/perform cell selection/perform cell reselection. Conversely, if the value of "cellBarred" is "not barred", it may be further determined whether the cell allows the user terminals to reside on/perform cell selection/perform cell reselection according to the value of "cellReservedForOperatorUse". Specifically, if the value of "cellReservedForOperatorUse" is "reserved", UEs with access class of 11 or 15 may select this cell as a candidate cell to reside on/perform cell selection/ perform cell reselection. On the other hand, if the value of "cellReservedForOperatorUse" is "not reserved", any UE may select this cell as the candidate cell to reside on/perform cell selection/perform cell reselection.

In addition, in the LTE system, the base station broadcasts, through SIB2, to user terminals in the cell information indicating a relationship between an access restriction of the cell managed by the base station (that is, the restriction on whether the cell allows user terminals access to) and the access classes/ACDC categories of the user terminals. When a cell is selected for residing on, the user terminals may ignore this restriction. In addition, when a radio resource control connection establishment is started, the user terminal may determine whether it may access to the cell according to the above indication in SIB2 and its own access class.

Similarly, in the implementation, the base station 10 may set the same information as the above Table 1 for the cell managed by the base station 10 for aerial user terminals, as the indication information indicating the support capability of the cell for aerial user terminals. And then the base station 10 broadcasts the indication information to the user terminals in the cell through the SIB1, including aerial user terminals. In this case, "cellBarred" may indicate whether the cell managed by the base station allows the aerial user terminals to reside on/perform cell selection perform cell reselection. If the value of "cellBarred" or is "barred", the cell does not allow the aerial user terminals to reside on/perform cell selection/perform cell reselection. Conversely, if the value of "cell/Barred" is "not barred", it may be further determined whether the cell allows the aerial user terminals to reside on/perform cell selection/perform cell reselection according to the value of "cellReservedForOperatorUse". For example, if the value of "cellReservedForOperatorUse" is "reserved", the user terminals with access class of 11 or 15 may select this cell as the candidate cell to reside on/perform cell selection/perform cell reselection, that is, the aerial user terminals are not allowed to access to the cell. On the other hand, if the value of "cellReservedForOperaturUse" is "not reserved", any UE including the aerial user terminals may select this cell as the candidate cell to reside on/perform cell selection/perform cell reselection.

In addition, the base station 10 may set, for the cell managed by itself, the same relationship between the access restriction on the aerial user terminals and the access classes of the aerial user terminals as that in the LTE, and broadcast the information indicating the relationship to user terminals in the cell through SIB2. An aerial user terminal may determine whether it may access to the cell according to the above indication information in SIB2 when starting the radio resource control connection establishment.

Accordingly, in step S201, the aerial user terminal 20 may receive the above indication information by receiving the system information (SIB1 or SIB2) broadcasted by the base station 10. Then, the aerial user terminal 20 may determine whether the cell managed by the base station 10 supports aerial user terminals according to the indication information. If the cell managed by the base station 10 does not support aerial user terminals, in step S202, the aerial user terminal 20 does not select or access to the cell. Conversely, if the cell managed by the base station 10 supports aerial user terminals, in step S202, the aerial user terminal 20 may select the cell for residing on or accessing to the cell. In the implementation, the base station 10 may also transmit the configuration information related to aerial user terminals through one or more of the newly defined SIBs or one or more of the existing SIBs in the manner described above. When the aerial user terminal 20 is in the connected state, the base station 10 may also transmit the above configuration information through the RRC signaling or a combination of the RRC signaling and the system information. Accordingly, the aerial user terminal may receive the system information and/or RRC signaling, and perform corresponding operations and settings according to the configuration information. The configuration information may include, for example, one or more of flight limitation information, power limitation information, and optimized communication parameters, which has been described above and is not repeated here.

In a third implementation, the at least one cell may be a plurality of cells including the cell managed by the base station 10. In the implementation, the information indicating the support capability of the at least one cell for aerial user terminals may be a list indicating at least one cell that supports aerial user terminals. For example, the list may be a list including the cells managed by the base station 10 and cells supporting aerial user terminals that may be used for intra-frequency cell reselection or handover, or may be a list including cells managed by the base station 10 and cells supporting aerial user terminals at one or more available frequencies that may be used for inter-frequency cell reselection or handover. Alternatively, the list may also be a list of all cells, where identifiers are set for cells that support aerial user terminals to distinguish them from the cells that do not support aerial user terminals, so that aerial terminals may identify cells that support aerial user terminals.

In the implementation, the base station 10 may transmit the indication information through the system information.

In one example, the base station 10 may broadcast the indication information to user terminals in the cell through the newly defined SIBs. Accordingly, in step S201, the aerial user terminal 20 may receive the indication information from the base station 10 by receiving the system information or the SIBs. Then, the aerial user terminal 20 may determine whether the at least one cell supports aerial user terminals according to the indication information. If the aerial user terminal 20 determines that the at least one cell supports aerial user terminals, in step S202, the aerial user terminal 20 may access to one of the at least one cell. Conversely, if the aerial user terminal 20 determines that the at least one cell does not support aerial user terminals, in step S202, the aerial user terminal 20 does not access to the at least one cell. In addition, in this example, the base station may also transmit the configuration information related to aerial user terminals to user terminals in the cell through one or more of the newly defined SIBs in the manner described above. In addition, when the aerial user terminal 20 is in the connected state, the base station 10 may also transmit the above configuration information through the RRC signaling or a combination of the RRC signaling and the above system information. Accordingly, the aerial user terminal 20 may receive the system information and/or RRC signaling, and perform corresponding operations and settings according to the configuration information. The configuration information may include, for example, one or more of flight limitation information, power limitation information, and optimized communication parameters, which has been described above and is not repeated here.

In another example, the base station 10 may broadcast the indication information (cell list) to user terminals in the cell through one or more of the existing SIBs. For example, the base station 10 may transmit the indication information by using any one or more of the existing SIBs, or by using the SIB4 or SIB5 in the manner described above. Accordingly, in step S201, the aerial user terminal 20 may receive the indication information from the base station 10 by receiving the system information or the SIBs. Then, the aerial user terminal 20 may determine whether the at least one cell supports aerial user terminals according to the indication information. If the at least one cell supports aerial user terminals, in step S202, the aerial user terminal 20 may select one of the at least one cell to reside on or access to one of the at least one cell. Conversely, if the at least one cell does not support aerial user terminals, in step S202, the aerial user terminal 20 does not select or access to the at least one cell. In addition, in this example, the base station may also transmit the configuration information related to aerial user terminals to the user terminals in the cell through one or more of the existing SIBs in the manner described above. In addition, when the aerial user terminal 20 is in the connected state, the base station 10 may also transmit the above configuration information through RRC signaling or a combination of the RRC signaling and the above system information. Accordingly, the aerial user terminal 20 may receive the system information and/or RRC signaling, and perform corresponding operations and settings according to the configuration information. The configuration information may include, for example, one or more of flight limitation information, power limitation information, and optimized communication parameters, which has been described above and is not repeated here.

Figure 3:
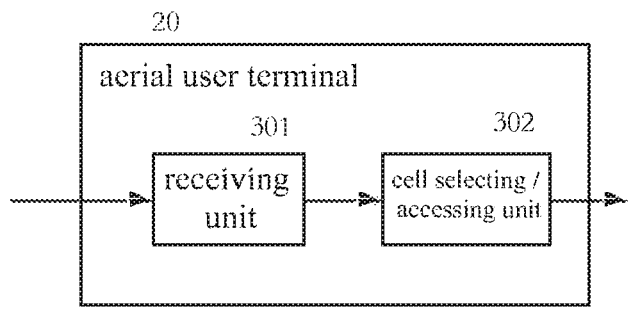
FIG. 3 is a block diagram of the aerial user terminal according to the first embodiment of the present disclosure.

Hereinafter, an aerial user terminal according to the first embodiment of the present disclosure will be described with reference to FIG. 3. FIG. 3 illustrates a block diagram of the aerial user terminal. Since the functions of the aerial user terminal in the embodiment are the same as the details of the method described above with reference to FIG. 2, a detailed description of the same content is omitted here for simplicity.

As shown in FIG. 3, the aerial user terminal 20 includes a receiving unit 301 and a cell selecting/accessing unit 302. It should be noted that although only two units of the aerial user terminal 20 are shown in FIG. 3, this is only schematic, and the aerial user terminal 20 may also include one or more other units, which are omitted because they have nothing to do with the inventive concept.

The receiving unit 301 may receive, from the base station 10, indication information indicating a support capability of at least one base station for aerial user terminals. The cell selecting/accessing unit 302 may selectively perform cell selection or access for one of the at least one base station according to the indication information.

As described above, in the first implementation, the at least one cell may be the cell managed by the base station 10 itself. That is, the base station 10 may transmit to the aerial user terminal 20 the indication information indicating the support capability of the cell managed by the base station 10 for aerial user terminals. For example, the base station 10 may transmit the indication information through its transmitting unit (not shown).

In the implementation, the base station 10 may broadcast, to the user terminals in the cell managed by the base station 10, indication information indicating whether or not the cell managed by the base station 10 supports aerial user terminals. Accordingly, the receiving unit 301 of the aerial user terminal 20 may receive the indication information. Then, the cell selecting/accessing unit 302 may determine whether or not the cell managed by the base station 10 supports aerial user terminals according to the indication information. If the cell managed by the base station 10 supports aerial user terminals, the cell selecting/accessing unit 302 may perform cell selection on the cell or access to the cell. Conversely, if the cell managed by the base station 10 does not support aerial user terminals, the cell selecting/accessing unit 302 does not perform the operation of performing cell selection/access the cell. That is, in the implementation, the aerial user terminal 20 may only reside on or access to the cell supporting aerial user terminals.

In the implementation, the base station 10 may also transmit configuration information related to aerial user terminals to the aerial user terminal. Accordingly, the receiving unit 301 may receive the configuration information. Then, the cell selecting/accessing unit 302 and/or other units (for example, a flight controlling unit, not shown) may control its own flight and/or communication with the wireless communication network (base station) according to the configuration information. As described above, the configuration information may include flight restriction information, for example, information on restrictions on the flying altitude and/or the flying speed of the aerial user terminal. The configuration information may also include other types of restriction information, for example, information on restrictions on the transmission power of the aerial user terminal. The configuration information may further include a list of cells supporting aerial user terminals that may be used for RRM measurement of intra-frequency cell reselection or handover, or may include the available frequencies that may be used for RRM measurement of inter-frequency cell reselection or handover, and a list of cells that support aerial user terminals on each frequency. The configuration information may further include one or more communication parameters optimized for the aerial user terminal.

In the implementation, the base station 10 may transmit the configuration information through system information. Accordingly, the receiving unit 301 may receive the configuration information by receiving the system information. In one example, the base station 10 may additionally transmit the configuration information by using the existing one or more SIBs. In this case, the receiving unit 301 may receive the configuration information by receiving the one or more SIBs. In another example, the base station 10 may transmit the configuration information by using one or more newly defined SIBs in addition to the existing SIBs. In this case, the receiving unit 301 may receive the configuration information by receiving the one or more newly defined SIBs. As described above, the newly defined SIBS may be received only by aerial user terminals, and not by the ground user terminals. In another example, if the aerial user terminal 20 is in a connected (RRC_connected) state, the base station may also transmit one or more pieces of the above configuration information through RRC signaling. In this case, the receiving unit 301 may receive the configuration information by RRC signaling. Alternatively, in this example, the base station may also use the system information and the RRC signaling in combination to transmit the configuration information. In this case, the receiving unit 301 may receive the configuration information by receiving a combination of the system information and the RRC signaling.

In the second implementation, the at least one cell may be a cell managed by the base station 10 itself. That is, the base station 10 may transmit to the aerial user terminal 20 the indication information indicating the support capability of the cell managed by the base station 10 for aerial user terminals.

In the implementation, the base station 10 may transmit or broadcast to the aerial user terminal 20 the indication information of the support capability of the cell managed by the base station 10 for aerial user terminals 20 through the system information. As described above, the base station 10 may set the same information for aerial user terminals as the above Table 1 as the indication information indicating the support capability of the base station 10 for aerial user terminals. Then, the base station 10 may broadcast the indication information to the user terminals in the cell, including aerial user terminals, through SIB1. In addition, the base station 10 may set, for the cell managed by itself, a relationship between an access restriction on aerial user terminals and access classes of the aerial user terminals in the manner described above, and broadcast the information indicating the relationship through the SIB2 to user terminals in the cell.

Accordingly, the receiving unit 301 may receive the above indication information by receiving the SIB 1 or SIB2 broadcasted by the base station 10. Then, the cell selecting/accessing unit 302 may determine whether the cell managed by the base station 10 supports aerial user terminals according to the indication information. If the cell managed by the base station 10 does not support aerial user terminals, the cell selecting/accessing unit 302 does not perform the operation of cell reselection or cell access for the cell. Conversely, if the cell managed by the base station 10 supports aerial user terminals, the cell selecting / accessing unit 302 may perform cell selection or access for the cell.

In the implementation, the base station 10 may also transmit the configuration information related to aerial user terminals through one or more of the newly defined SIBs or one or more of the existing SIBs in the manner described above. When the aerial user terminal 20 is in the connected state, the base station 10 may also transmit the above configuration information through the RRC signaling or a combination of the RRC signaling and the system information. Accordingly, the receiving unit 301 may receive the system information and/or RRC signaling, and then the cell selecting/accessing unit 302 and/or other units (not shown) may perform corresponding operations and settings according to the configuration information.

In the third implementation, the at least one cell may be a plurality of cells including the cell managed by the base station 10. In the implementation, as described above, the information indicating the support capability of the at least one cell for aerial user terminals may be a list indicating at least one cell that supports aerial user terminals. For example, the list may be a list including the cells managed by the base station 10 and cells supporting aerial user terminals that may be used for intra-frequency cell reselection or handover, or may be a list including cells managed by the base station 10 and cells supporting aerial user terminals at one or more available frequencies that may be used for inter-frequency cell reselection or handover. Alternatively, the list may also be a list of all cells in the wireless communication network, where identifiers are set for cells that support aerial user terminals to distinguish them from the cells that do not support aerial user terminals, so that aerial terminals may identify cells that support aerial user terminals.

In the implementation, the base station 10 may transmit the indication information through the system information. In one example, the base station 10 may broadcast the indication information to user terminals in the cell through the newly defined SIBs. Accordingly, the receiving unit 301 may receive the indication information from the base station 10 by receiving the system information or the SIBs. Then, the cell selecting / accessing unit 302 may determine whether the at least one cell supports aerial user terminals according to the indication information. If the at least one cell supports aerial user terminals, the cell selecting/accessing unit 302 may perform cell selection/reselection for one of the at least one cell, or may access to one of the at least one cell. Conversely, if the at least one cell does not support aerial user terminals, in step S202, the cell selecting/accessing unit 302 does not perform the operation of cell selection/reselection for the at least one cell or accessing to the at least one cell. In addition, in this example, the base station may also transmit the configuration information related to aerial user terminals to user terminals in the cell through one or more of the newly defined SIBs in the manner described above. In addition, when the aerial user terminal 20 is in the connected state, the base station 10 may also transmit the above configuration information through RRC signaling or a combination of the RRC signaling and the above system information. Accordingly, the receiving unit 301 may receive the system information and/or RRC signaling, and the cell selecting/accessing unit 302 and/or other units may perform corresponding operations and settings according to the configuration information. The configuration information may include, for example, one or more of flight limitation information, power limitation information, and optimized communication parameters, which has been described above and is not repeated here.

In another example, the base station 10 may broadcast the indication information (cell list) to user terminals in the cell managed by the base station 10 through the existing SIBs. For example, the base station 10 may transmit the indication information by using any one of the existing SIBs, or by using the SIB4 or SIB5 in the manner described above. Accordingly, the receiving unit 301 may receive the indication information from the base station 10 by receiving the system information or the SIBs. Then, the cell selecting / accessing unit 302 may determine whether the at least one cell supports aerial user terminals according to the indication information. If the at least one cell supports aerial user terminals, the cell selecting/accessing unit 302 may perform cell selection/reselection for one of the at least one cell or may access to one of the at least one cell. Conversely, if the at least one cell does not support aerial user terminals, in step S202, the accessing unit 302 does not perform the operation of performing cell selection/reselection for the at least one cell or accessing to the at least one cell. In addition, in this example, the base station may also transmit the configuration information related to aerial user terminals to user terminals in the cell through one or more of the existing SIBs in the manner described above. In addition, when the aerial user terminal 20 is in the connected state, the base station 10 may also transmit the above configuration information through RRC signaling or a combination of the RRC signaling and the above system information. Accordingly, the receiving unit 301 may receive the system information and/or RRC signaling, and then the cell selecting/accessing unit 302 and/or other units may perform corresponding operations and settings according to the configuration information. The configuration information may include, for example, one or more of flight limitation information, power limitation information, and optimized communication parameters, which has been described above and is not repeated here.

In addition, the base station according to the first embodiment of the present disclosure may include a transmitting unit configured to transmit the above various indication information and configuration information. The operation details are the same as those described above, and are not repeated here.

With the above embodiment of the present disclosure, the base station may notify the aerial user terminal of the indication information of whether the cell managed by the base station or other cells support aerial user terminals, so that the aerial user terminal may only reside on or access to the cells that support aerial user terminals. In addition, the base station may notify the aerial user terminal of related configuration information, including various restriction information, and the aerial user terminal may control its own flight and communication according to the configuration information. Therefore, it is possible to prevent the aerial user terminal from accessing to inappropriate cells, and to ensure that the aerial user terminal meets various restriction conditions, thereby avoiding security problems and unnecessary interference.

Hereinafter, a second embodiment of the present disclosure will be described with reference to the accompanying drawings.

In the LTE system, the base station may detect neighbor cells and maintain a Neighbor Relationship Table (NRT) through an Automatic Neighbor Relationship (ANR) function. Specifically, the base station creates the NRT and records related information of its own neighbor cells, and adds related information of a new neighbor cell to the NRT when the new neighbor cell is found, and deletes a neighbor cell from the NRT when the neighbor cell is out of date. Table 1 below shows an example of NRT.

TABLE 2

| NR | TCI | No Remove | No HO | No X2 |
|----|-------|-----------|-------|-------|
| 1  | TCI#1 |           |       |       |
| 2  | TCI#2 |     ✓     |       |   ✓   |
| 3  | TCI#3 |           |   ✓   |       |

Each Neighbor Relation (NR) entry in Table 2 records related information of one neighbor cell. In each entry, the TCI is a target cell identifier of the neighbor cell (that is, a target cell). For the LTE network, the TCI may correspond to an E-UTRAN Cell Global Identifier (ECGI) and a Physical Cell identifier (PCI) of the neighbor cell. Each NR entry may also have three attributes. "No Remove" indicates whether the base station will remove the NR from the NRT, for example when the NR is selected (✓), it indicates that the NR is not removed; "No HO" indicates whether the base station will use the NR for handover, for example, when the NR is selected ("✓"), the NR is not used for handover; "No X2" indicates whether the NR will use the X2 interface to initiate an related process for managing a base station of a corresponding cell , for example, when the NR is selected (✓), the NR will not use the X2 interface to initiate the process.

Figure 4:
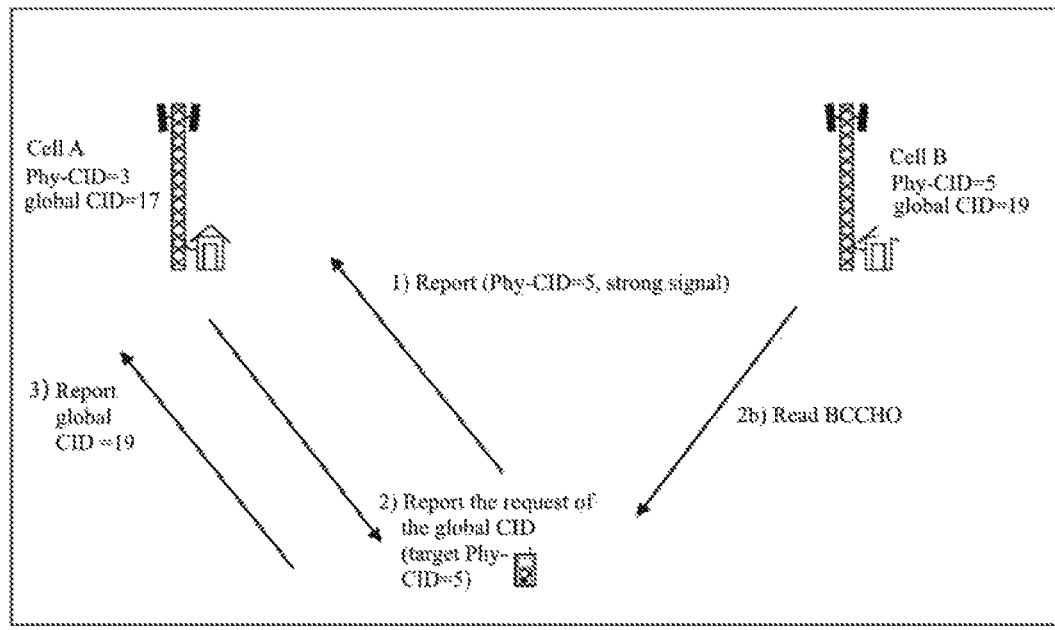
FIG. 4 schematically illustrates a process in which a base station performs an intra-frequency Automatic Neighbor Relationship (ANR) function in an LTE system.

The ANR function may include an intra-frequency ANR function and an inter-frequency ANR function. FIG. 4 schematically illustrates a procedure in which the base station performs the intra-frequency ANR function in the LTE system. The base station that manages cell A shown in FIG. 4 may correspond to the base station 10 shown in FIG. 1. As shown in FIG. 4, in step 1), the user equipment in the cell A measures signal reception quality of the neighbor cell, and transmits a measurement report about the neighbor cell to the base station. In this example, assuming that the neighbor cell is cell B, the measurement report contains indication information PCI (for example, 5) of the cell B, but does not contain global CID (for example, EGCI) of the cell B. In step 2), the base station transmits a request to report the global CID (for example, EGCI) of the cell B to the user equipment with a newly discovered PCI of the cell B as a parameter. In response to the request, in step 2b), the user equipment acquires the global CID (for example, 19) of the cell B by receiving a broadcast channel transmitted by the cell B, and in step 3), the user equipment reports the global CID of the cell B to the base station. Then, the base station may add an entry corresponding to the cell B to the NRT. In this way, the base station maintains the NRT.

Figure 5:
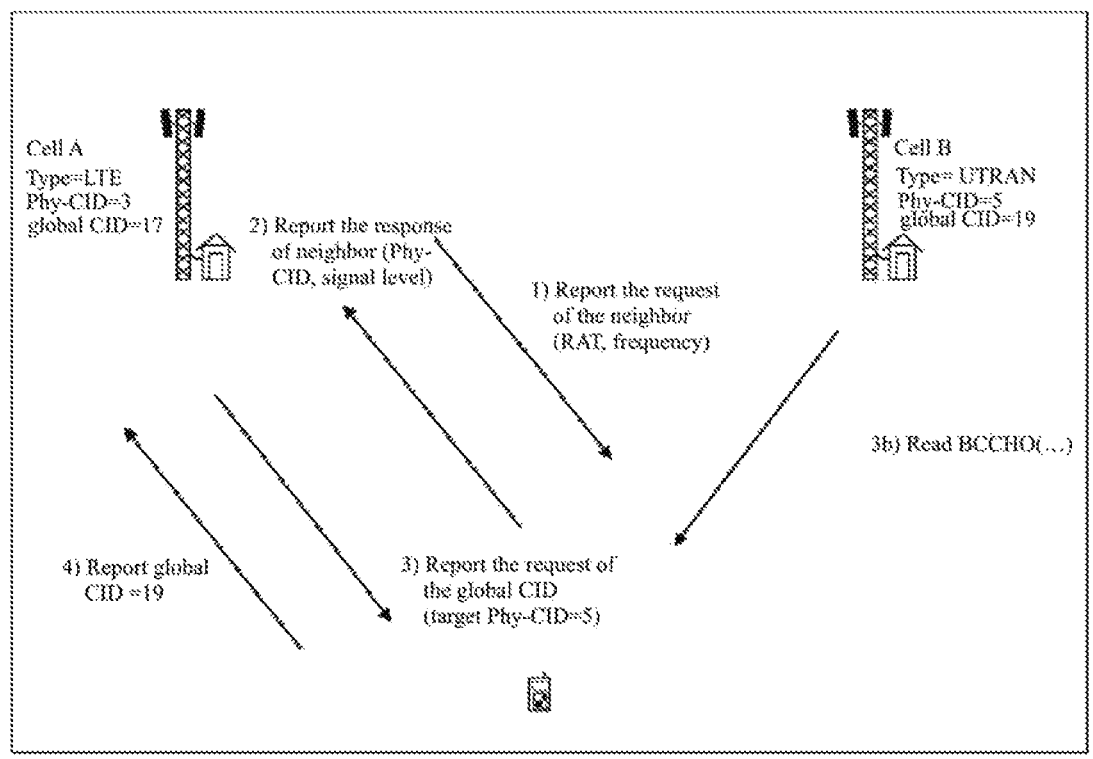
FIG. 5 schematically illustrates a process in which the base station performs an inter-frequency ANR function in the LTE system.

FIG. 5 schematically illustrates a procedure in which the base station performs the inter-frequency ANR function in the LTE system. The base station that manages cell A shown in FIG. 5 may correspond to the base station 10 shown in FIG. 1. As shown in FIG. 5, in step 1), the base station (LTE base station) that manages the cell A transmits a request to the user equipment to measure a neighbor cell of other frequencies or RATs. In step 2), in response to the request, the user equipment measures signal reception quality of the neighbor cell, and transmits a measurement report about the neighbor cell to the base station. In this example, assuming that the neighbor cell is a cell B (UTRAN base station), the measurement report contains the PCI (for example, 5) of the cell B, but does not contain the global CID (EGCI) of the cell B. In step 3), the base station transmits a request to report the global CID (for example, EGCI) of the cell B to the user equipment with a newly discovered PCI of the cell B as a parameter. In response to the request, in step 3b), the user equipment acquires the global CID (for example, 19) of the cell B by receiving a broadcast channel transmitted by the cell B, and in step 4), the user equipment reports the global CID of the cell B to the base station. Then, the base station may add an entry corresponding to the cell B to the NRT. In this way, the base station maintains the NRT.

With the NRT, the base station may generate a Neighbor Cell List (NCL) and indicate the user equipment to perform RRM measurement on the cells in the NCL, so as to perform cell reselection and handover, and the like.

When performing the ANR function in the LTE system, the base station does not distinguish between a ground user terminal and an aerial user terminal, that is, the base station does not distinguish between neighbor cells reported by the ground user terminal and neighbor cells reported by the aerial user terminal. However, compared with the ground user terminal, the aerial user terminal may receive signals from more cells in the air and face different wireless propagation conditions. Therefore, neighboring cells discovered by the aerial user terminal may not be applicable to the ground user terminal. In this case, if the neighboring cells reported by the ground user terminal and the neighboring cells reported by the aerial user terminal are used indiscriminately to maintain the NRT, system performance may be reduced. For example, if the base station indicates the ground user equipment to perform RRM measurements on the cells in the NCL generated based on such NRT, some RRM measurements (for example, RRM measurements for the cells reported by the aerial user terminal) are unnecessary. On the other hand, if the base station indicates the aerial user terminal to perform RRM measurements on the cells in the NCL generated based on such NRT, since some cells do not support the aerial user terminal, the RRM measurements on these cells are also unnecessary.

In the second embodiment of the present disclosure, when the base station maintains the NRT through the ANR function, the base station distinguishes between the ground user terminal and the aerial user terminal, thereby avoiding the above problems.

Hereinafter, a method for maintaining the NRT according to the second embodiment of the present disclosure will be described with reference to FIG. 6, and the method may be performed by the base station 10 shown in FIG. 1. In the following description, the base station 10 is taken as an example for description.

Figure 6:
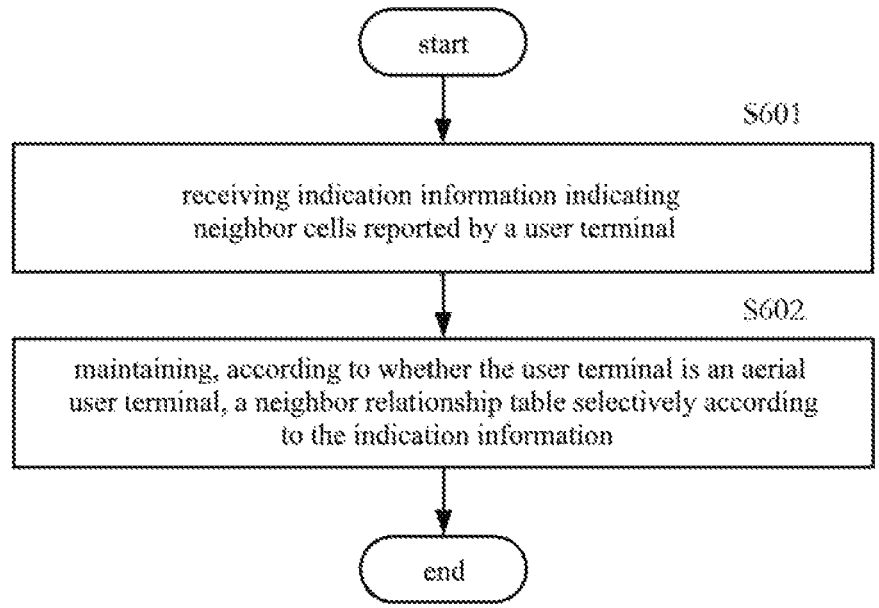
FIG. 6 is a flowchart of a method of maintaining the NRT performed by the base station according to a second embodiment of the present disclosure.

As shown in FIG. 6, in step S601, the base station 10 may receive indication information indicating neighbor cells reported by a user terminal.

Specifically, as described above, a user terminal in the cell may measure the reception quality of signals that are received from respective cells, and report the reception quality of respective cells to the base station. The measurement report may include indication information of the neighbor cells and the signal reception quality of the neighbor cells measured by the user terminal. Accordingly, in step S601, the base station 10 may receive the indication information indicating the neighbor cells transmitted by the user terminal. In addition, the base station 10 may also receive the signal reception quality of respective neighboring cells.

Then, in step S602, the base station 10 may selectively maintain, according to whether the user terminal (that is, the user terminal that reports the indication information) is an aerial user terminal, the NRT according to the indication information.

Specifically, the base station 10 may determine in advance whether the user terminal in the cell is an aerial user terminal. For example, each terminal in the cell managed by the base station 10 may report to the base station 10 in advance whether it is an aerial user terminal. When receiving the indication information reported by the user terminal in step S601, the base station 10 determines whether the user terminal is an aerial user terminal or a ground user terminal, and selectively maintains the NRT according to the determination result in accordance with the indication information transmitted by the user terminal.

In a first implementation, when the base station 10 determines that the user terminal is an aerial user terminal, the base station 10 does not use the indication information transmitted by the user terminal (that is, does not use the neighbor cells indicated by the indication information) to maintain the NRT. That is, when performing the ANR function, the base station does not use aerial user terminals to collect neighbor cell information.

In a second implementation, when the base station 10 determines that the user terminal is an aerial user terminal, the base station may maintain (establish and/or update) a dedicated NRT for aerial user terminals. In other words, when receiving the indication information indicating the neighbor cells transmitted by aerial user terminals, the base station 10 does not use the indication information to maintain (update) the NRT previously maintained for ground terminals, but uses the indication information (that is, uses the neighbor cells indicated by the indication information) to maintain (establish and/or update) an NRT that is different from the NRT maintained for ground terminals and is dedicated to aerial user terminals.

In a third implementation, when the user terminal is an aerial user terminal, the base station 10 may maintain the NRT according to the neighbor cells indicated by the indication information. However, since the NRT was previously maintained based on the neighbor cells reported by ground user terminals, in order to avoid the problems described above, in the NRT, the neighbor cells reported by aerial user terminals are distinguished from the neighbor cells reported by user terminals (that is, ground user terminals) that are not aerial user terminals. For example, in the NRT, an identifier of only for aerial user terminals may be added to an entry for a neighbor cell reported by aerial user terminals to indicate that the neighbor cell corresponding to the entry is reported by aerial user terminals and the entry is only used for aerial user terminals.

In a fourth implementation, different from the second implementation, when the user terminal is an aerial user terminal, the base station may maintain (establish and/or update) an NRT dedicated to aerial user terminals, which is different from the NRT, according to the cells that support aerial user terminals in neighbor cells indicated by the indication information transmitted by the user terminal. In this case, when the user terminal is an aerial user terminal, the base station may request the user terminal to report whether the neighboring cells indicated by the indication information support aerial user terminals. Then, the base station may receive the report of the user terminal, and maintain (establish and/or update) the NRT dedicated to aerial user terminals according to the neighbor cells supporting aerial user terminals in the neighbor cells indicated by the indication information.

Figure 7:
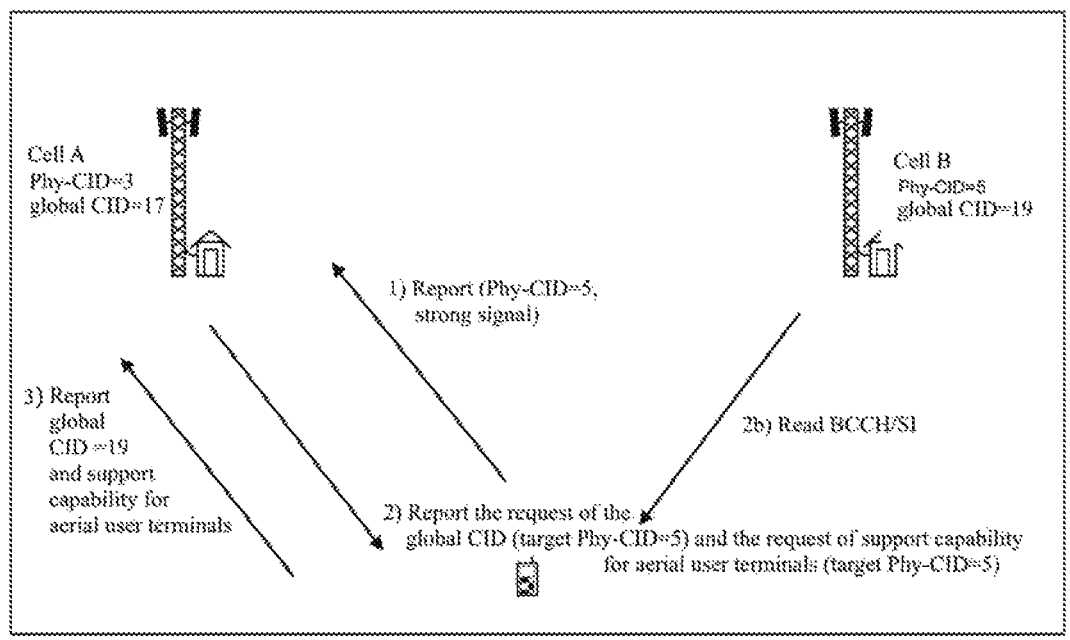
FIG. 7 schematically illustrates a process in which the base station performs the intra-frequency ANR function according to the second embodiment of the present disclosure.

FIG. 7 schematically illustrates a process of performing the intra-frequency ANR function in the implementation. As shown in FIG. 7, in step 1), the user equipment measures signal reception quality of a neighbor cell, and transmits a measurement report about the neighbor cell to the base station. In this example, assuming that the neighbor cell is cell B, the measurement report contains the PCI (for example, 5) of the cell B, but does not contain global CID (for example, EGCI) of the cell B. In step 2), the base station transmits a request to read the global CID (for example, EGCI) of the cell B to the user equipment with a newly discovered PCI of the cell B as a parameter and also requests the user equipment to report the support capability of the cell B for aerial user terminals. In response to the request, in step 2b), the user equipment acquires the global CID (for example, 19) of the cell B and the information about whether the cell B supports aerial user terminals by receiving a broadcast channel and/or system information transmitted by the cell B, and in step 3), the user equipment reports the global CID of the cell B and the support capability of the cell B for aerial user terminals to the base station. Then, the base station may maintain (establish and/or update), according to the report of the user terminal, the NRT dedicated to aerial user terminals in the manner described above according to the neighbor cells that support aerial user terminals in neighbor cells indicated by the indication information.

Figure 8:
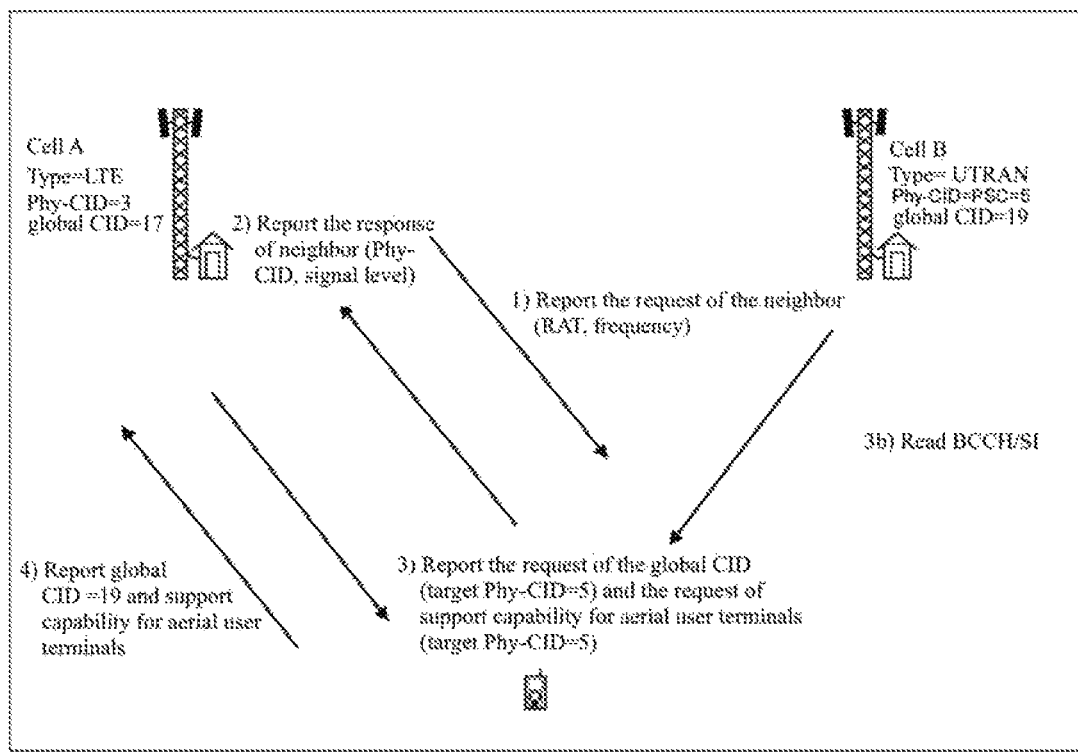
FIG. 8 schematically illustrates a process in which the base station performs the inter-frequency ANR function according to the second embodiment of the present disclosure.

FIG. 8 schematically illustrates a process of performing the inter-frequency ANR function in the implementation. As shown in FIG. 8, in step 1), the base station (LTE base station) that manages the cell A transmits a request to the user equipment to measure a neighbor cell of other frequencies or RATs. In step 2), in response to the request, the user equipment measures signal reception quality of the neighbor cell, and transmits a measurement report about the neighbor cell to the base station. In this example, assuming that the neighbor cell is a cell B (UTRAN base station), the measurement report contains the PCI (for example, 5) of the cell B, but does not contain the global CID (EGCI) of the cell B. In step 3), the base station transmits a request to report the global CID (for example, EGCI) of the cell B to the user equipment with a newly discovered PCI of the cell B as a parameter and also requests the user equipment to report the support capability of the cell B for aerial user terminals. In response to the request, in step 3b), the user equipment acquires the global CID of the cell B (for example, 19) and information about whether the cell B supports aerial user terminals by receiving a broadcast channel and/or system information transmitted by the cell B, and in step 4), the user equipment reports the global CID of the cell B and the support capability of the cell B for aerial user terminals to the base station. Then, the base station may receive the report of the user terminal, and maintain (establish and/or update) the NRT dedicated to aerial user terminals in the manner described above according to the neighbor cells that support aerial user terminals in neighbor cells indicated by the indication information.

In a fifth implementation, different from the third implementation, when the user terminal is an aerial user terminal, the base station may maintain (update) the NRT according to the cells supporting aerial user terminals in the neighbor cells indicated by the indication information. In the updated NRT, the neighbor cells reported by aerial user terminals are distinguished from the neighbor cells reported by user terminals that are not aerial user terminals. For example, in the NRT, an identifier of "only for aerial user terminals" may be added to an NR entry corresponding to a neighbor cell reported by aerial user terminals to indicate that the neighbor cell corresponding to the entry is reported by aerial user terminals and the entry is only used for aerial user terminals, and an identifier of "supporting aerial user terminals" is added to indicate that the neighbor cell supports the aerial user terminals.

In the implementation, when the user terminal is an aerial user terminal, the base station may request the user terminal to report whether the neighboring cells indicated by the indication information support aerial user terminals. Then, the base station may receive the report of the user terminal, and maintain (establish and/or update) the NRT according to the neighbor cells that support aerial user terminals in the neighbor cells indicated by the indication information. The base station may obtain the information on whether the neighbor cells support aerial user terminals in the manner described above with reference to FIG. 7 and FIG. 8, which is not repeated here.

Figure 9:
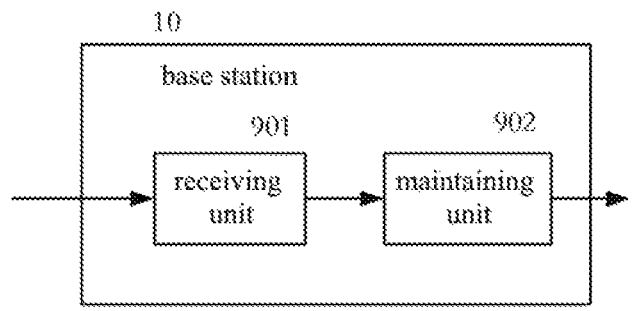
FIG. 9 illustrates a block diagram of the base station according to the second embodiment of the present disclosure.

Hereinafter, the base station according to the second embodiment of the present disclosure will be described with reference to FIG. 9. FIG. 9 illustrates a block diagram of the base station. Since the function of the base station in this embodiment is the same as the details of the method described above with reference to FIG. 6, a detailed description of the same content is omitted here for simplicity.

As shown in FIG. 9, the base station 10 includes a receiving unit 901 and a maintaining unit 902. It should be noted that although the base station is shown as including only 2 units in FIG. 9, this is only schematic, and the base station 10 may also include one or more other units, which are omitted because they have nothing to do with the inventive concept.

The receiving unit 901 may receive indication information indicating neighbor cells reported by a user terminal.

Specifically, as described above, a user terminal in the cell may measure the reception quality of signals that are received from respective cells, and report the reception quality of the cells to the base station. The measurement report may include indication information of the neighbor cells and the signal reception quality of the neighbor cells measured by the user terminal. Accordingly, the receiving unit 901 may receive the indication information indicating the neighbor cells transmitted by the user terminal, and may also receive the signal reception quality of respective neighboring cells.

The maintaining unit 902 may selectively maintain, according to whether the user terminal (that is, the user terminal that reports the indication information) is an aerial user terminal, the NRT according to the indication information.

As described above, the maintaining unit 902 may determine in advance whether the user terminal in the cell is an aerial user terminal. When the receiving unit 901 receives the indication information reported by the user terminal, the maintaining unit 902 determines whether the user terminal is an aerial user terminal or a ground user terminal, and selectively maintains the NRT according to the determination result in accordance with the indication information transmitted by the user terminal.

In a first implementation, when the maintaining unit 902 determines that the user terminal is an aerial user terminal, the maintaining unit 902 does not use the indication information transmitted by the user terminal (that is, does not use the neighbor cells indicated by the indication information) to maintain the NRT.

In a second implementation, when the maintaining unit 902 determines that the user terminal is an aerial user terminal, the maintaining unit 902 may maintain (establish and/or update) a dedicated NRT for aerial user terminals. In other words, when receiving the indication information indicating the neighbor cells transmitted by aerial user terminals, the maintaining unit 902 does not use the indication information to update the NRT previously maintained for the ground user terminals, but uses the indication information (that is, uses the neighbor cells indicated by the indication information) to maintain (establish and/or update) an NRT that is different from the NRT maintained for ground user terminals and is dedicated to aerial user terminals.

In a third implementation, when the maintaining unit 902 determines that the user terminal is an aerial user terminal, the maintaining unit 902 may update the NRT according to the neighbor cells indicated by the indication information. In this case, as described above, in the NRT, the neighbor cells reported by aerial user terminals are distinguished from the neighbor cells reported by user terminals (that is, ground user terminals) that are not aerial user terminals. For example, as described above, in the NRT, an identifier of "only for aerial user terminals" may be added to an entry for a neighbor cell reported by aerial user terminals.

In a fourth implementation, different from the second implementation, when the maintaining unit 902 determines that the user terminal is an aerial user terminal, the maintaining unit 902 may maintain (establish and/or update) an NRT dedicated to aerial user terminals, which is different from the NRT, according to the cells that support aerial user terminals in neighbor cells indicated by the indication information transmitted by the user terminal. In this case, when the user terminal is an aerial user terminal, the base station may request the user terminal to report whether the neighboring cells indicated by the indication information support aerial user terminals. Then, the receiving unit 901 may receive the report of the user terminal, and the maintaining unit 902 may maintain (establish and/or update) the NRT dedicated to aerial user terminals according to the neighbor cells supporting aerial user terminals in the neighbor cells indicated by the indication information.

In a fifth implementation, different from the third implementation, when the maintaining unit 902 determines that the user terminal is an aerial user terminal, the maintaining unit 902 may maintain (update) the NRT according to the cells supporting aerial user terminals in the neighbor cells indicated by the indication information. In the updated NRT, the neighbor cells reported by aerial user terminals are distinguished from the neighbor cells reported by user terminals that are not aerial user terminals. For example, in the NRT, identifiers of "only for aerial user terminals" and "supporting aerial user terminals" may be added to an NR entry corresponding to a neighbor cell reported by aerial user terminals. In the implementation, when the user terminal is an aerial user terminal, the base station may request the user terminal to report whether the neighboring cells indicated by the indication information support aerial user terminals. Then, the receiving unit 901 may receive the report of the user terminal, and the maintaining unit 902 may maintain (establish and/or update) the NRT according to the neighbor cells that support aerial user terminals in the neighbor cells indicated by the indication information.

Hereinafter, the user equipment according to the second embodiment of the present disclosure will be described with reference to FIG. 10. Since the functions performed by the various components of the user equipment are the same as those described above with reference to FIGS. 6-9, detailed descriptions thereof are omitted here.

Figure 10:
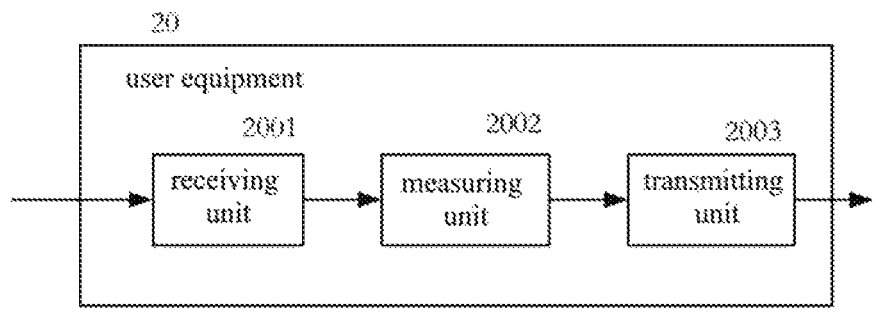
FIG. 10 illustrates a block diagram of the user terminal according to the second embodiment of the present disclosure.

As shown in FIG. 10, the user equipment 20 may include a receiving unit 2001, a measuring unit 2002, and a transmitting unit 2003. The receiving unit 2001 may receive a measurement request, a request to report a global CID of a relevant cell, and/or a request to report support capability of a relevant cell for aerial user terminals transmitted by the base station. The measuring unit 2002 may perform measurement on the relevant cell, thereby obtaining measurement reports of respective cells. The transmitting unit 2003 may transmit the above indication information indicating the neighbor cells, the measurement report, the global CID of the relevant cell, and/or the support capability of the relevant cell for aerial user terminals to the base station 10. Therefore, the base station 10 may maintain the NRT by using various information transmitted by the user equipment 20.

With the above embodiments of the present disclosure, when the ANR function is used to maintain the NRT, the neighbor cells reported by aerial user terminals are distinguished from the neighbor cells reported by other user terminals (ground user terminals). In this way, when indicating a ground user equipment to perform RRM measurement, the base station may generate the Neighbor Cell List (NCL) to be measured only based on the NRT maintained by the ground user terminal, thereby preventing the ground user terminal from performing unnecessary measurement for the neighbor cells reported by aerial user terminals. On the other hand, when indicating an aerial user terminal to perform RRM measurement, the base station may generate the Neighbor Cell List (NCL) to be measured only based on the NRT maintained by aerial user terminals, thereby preventing the aerial user terminal from performing unnecessary measurement for the neighbor cells reported by ground user terminals. Of course, when needed, the base station may not distinguish between the neighbor cells reported by ground user terminals and the neighbor cells reported by aerial user terminals, so that the user terminal performs RRM measurement according to the NCL generated based on the entire NRT.

<Hardware>

It should be noted that block diagrams used for the illustration of the above embodiments represent blocks in functions. These functional blocks (structural units) may be realized by any combination of hardware and/or software. In addition, the means for implementing respective functional blocks is not particularly limited. That is, respective functional blocks may be realized by one apparatus that is physically and/or logically aggregated, or may be realized by directly and/or indirectly (for example, wired and/or wireless) connecting two or more physically and/or logically separate apparatuses and using the plurality of apparatuses.

Figure 11:
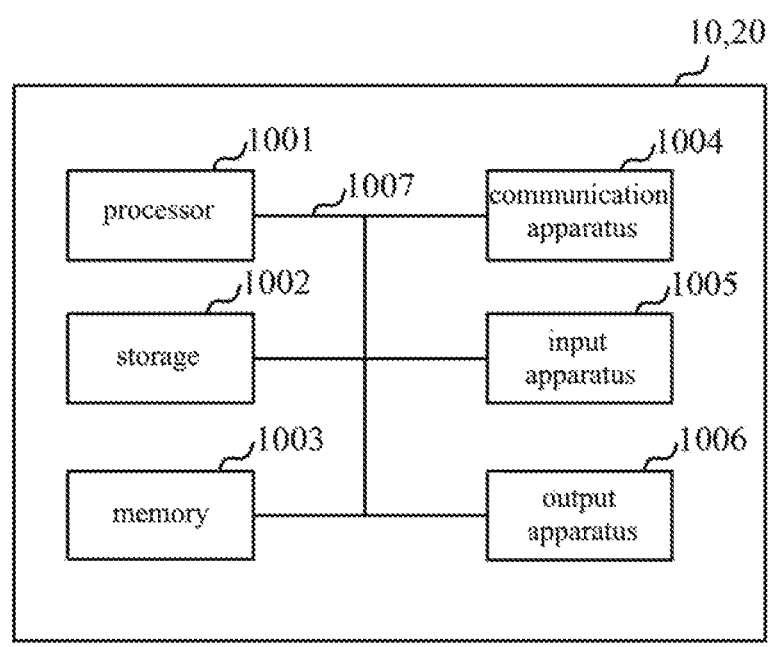
FIG. 11 is a diagram illustrating an example of a hardware configuration of a radio base station and the user terminal according to the present disclosure.

For example, a radio base station, a user terminal, and the like according to the embodiments of the present invention can function as a computer that executes processing of the wireless communication method of the present invention. FIG. 11 is a diagram illustrating an example of a hardware configuration of related radio base station and a user terminal according to the embodiments of the present invention. The above described radio base station 10 and user terminal 20 may be physically designed as a computer apparatus including a processor 1001, a storage 1002, a memory 1003, a communication apparatus 1004, an input apparatus 1005, an output apparatus 1006, and a bus 1007 and the like.

It should be noted that, in the following description, the word "apparatus" may be replaced by "circuit", "device" "unit" and so on. It should be noted that the hardware structure of a radio base station 10 and user terminal 20 may he designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented either simultaneously or in sequence, or in different manners, on two or more processors. It should be noted that the processor 1001 may be implemented with one or more chips.

Each function of the radio base station 10 and user terminal 20 is implemented by reading predetermined software (program) on hardware such as the processor 1001 and the memory 1002, so as to make the processor 1001 perform calculations, and by controlling the communication carried out by the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the foregoing accessing unit, maintaining unit, and the like may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the accessing unit of user equipment 500 may be implemented by a control program stored in the memory 1002 and operated by the processor 1001, and may also be implemented similarly for other function blocks.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register", a "cache", a "main memory" (primary storage apparatus) and so on. The memory 1002 can store executable programs (program codes), software modules and so on for implementing the wireless communication methods according to embodiments of the present invention.

The storage 1003 is a computer-readable recording medium, and may be constituted by, for example, at least one of a flexible disk, a floppy (registered trademark) disk, a magneto- optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device", a "network controller", a "network card", a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above described transmitting unit, receiving unit, etc. may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). It should be noted that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be installed with at least one of these pieces of hardware.

<Variation>

In addition, it should be noted that the terms illustrated in the present specification and/or the terms required for the understanding of the present specification may be substituted with terms having the same or similar meaning. For example, a channel and/or a symbol may be a signal. in addition, the signal may be a message. A reference signal may be abbreviated as an "RS (Reference Signal)", and may be referred to as a "pilot", a "pilot signal" and so on, depending on which standard applies. in addition, a component carrier (CC) may be referred to as a carrier frequency, a cell, or the like.

Also, the information and parameters and so on described in this specification may be represented in absolute values or in relative values with respect to predetermined values, or may be represented in corresponding other information. For example, radio resources may be indicated by predetermined indices. In addition, equations to use these parameters and so on may be used, apart from those explicitly disclosed in this specification.

The names used for parameters and so on in this specification are not limited in any respect. For example, since various channels (PUCCH (Physical Uplink Control Channel), PDCCH (Physical Downlink Control Channel) and so on) and information elements can be identified by any suitable names, the various names assigned to these various channels and information elements are not limited in any respect.

The information, signals and so on described in this specification may be represented by using any one of various different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and /or output may be stored in a specific location (for example, in a memory), or may be managed in a control table. The information, signals and so on that are input and /or output may be overwritten, updated or appended. The information, signals and so on that are output may be deleted. The information, signals and so on that are input may be transmitted to other apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

It should be noted that physical layer signaling may also be referred to as L1/L2 (Layer 1/Layer 2) control information (L1/L2 control signals), L1 control information (L1 control signal) and so on. Also, RRC signaling may be referred to as "RRC messages", and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, a reporting "X") does not necessarily have to be carried out explicitly, and can be carried out implicitly (by, for example, not reporting this piece of information, or by reporting a different piece of information).

Regarding decisions, which may be made in values represented by one bit (0 or 1), may be made by a true or false value (Boolean value) represented by true or false, or may be made by comparing numerical values (for example, comparison against a predetermined value).

Software, whether referred to as "software", "firmware", "middleware", "microcode" or "hardware description language", or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are included in the definition of communication media.

The terms "system" and "network" as used herein are used interchangeably.

In the present specification, the terms "base station (BS)", "radio base station", "eNB", "gNB", "cell", "sector", "cell group", "carrier" and "component carrier" may be used interchangeably. A base station may be referred to as a "fixed station", "NodeB", "eNodeB (eNB)", "access point", "transmission point", "receiving point", "femto cell", "small cell" and so on.

A base station can accommodate one or more (for example, three) cells (also referred to as "sectors"). When a base station accommodates a plurality of cells, the entire coverage area of the base station can be partitioned into a plurality of smaller areas, and each smaller area can provide communication services with base station subsystems (for example, indoor small base stations (RRI-Is (Remote Radio Heads))). The term "cell" or "sector" refers to part or all of the coverage area of a base station and/or a base station subsystem that provides communication services within this coverage.

In the present specification, the terms "mobile station (MS)", "user terminal", "user equipment (UE)" and "terminal" may be used interchangeably.

A mobile station is also sometimes used by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the radio base station 10 described above may have the functions of the user terminal 20. In addition, terms such as "uplink" and "downlink" may be interpreted as "side." For example, an uplink channel may be interpreted as a side channel.

Likewise, the user terminals in this specification may be interpreted as radio base stations. In this case, the radio base station 10 may have the functions of the user terminal 20 described above.

In the present specification, it is assumed that certain actions to be performed by base station may, in some cases, be performed by its higher node (upper node). In a network comprised of one or more network nodes with base stations, it is clear that various operations that are performed to communicate with terminals can be performed by base stations, one or more network nodes (for example, MMES (Mobility Management Entities), S-GW (Serving-Gateways), and so on may be possible, but these are not limiting) other than base stations, or combinations of these.

The respective aspects/embodiments illustrated in this specification may be used individually or in combinations, which may also be switched and used during execution. The order of processes, sequences, flowcharts and so on of the respective aspects/embodiments described in the present specification may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000 (Code Division Multiple Access), UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on", unless otherwise specified. In other words, the phrase "based on" means both "based only on" and "based at least on."

Any reference to elements with designations such as "first", "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and optical (both visible and invisible) regions.

When terms such as "including", "comprising" and variations of these are used in this specification or in claims, these terms are intended to be inclusive, in a manner similar to the way the term "provide" is used. Furthermore, the term "or" as used in this specification or in claims is intended to he not an exclusive disjunction.

Although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

What is claimed is:

1. A method performed by an aerial user terminal, comprising:
receiving, from a base station, indication information indicating support capability of at least one cell for aerial user terminals;
performing cell selection or access for one of the at least one cell selectively according to the indication information;
receiving configuration information related to aerial user terminals from the base station; and
performing corresponding operations and configurations according to the configuration information to control its own flight,
wherein the performing cell selection or access for the one of the at least one cell selectively according to the indication information further comprises performing cell selection or access for one of the at least one cell selectively according to the indication information and the configuration information,
wherein the configuration information includes flight restriction information related to flying altitude and/or the flying speed of the aerial user terminal, and
wherein the configuration information further includes information related to at least one of intra-frequency cell reselection or handover and inter-frequency cell reselection or handover.

2. The method according to claim 1, wherein the indication information is information indicating whether a cell managed by the base station supports aerial user terminals, and is included in a broadcast channel transmitted by the base station.

3. The method according to claim 2, further comprising:
receiving the configuration information related to aerial user terminals from the base station through the system information.

4. The method according to claim 1, wherein the indication information is a list indicating the at least one cell supporting aerial user terminals, and is included in system information transmitted by the base station.

5. The method according to claim 1, wherein the aerial user terminal is in a connected state, and the method further comprises:
receiving the configuration information related to aerial user terminals from the base station through radio resource control signaling.

6. An aerial user terminal comprising:
a receiving unit configured to receive, from a base station, indication information indicating support capability of at least one cell for aerial user terminals; and
a cell selecting/accessing unit configured to selectively perform cell selection or access for one of the at least one cell according to the indication information,
wherein the receiving unit is further configured to receive configuration information related to aerial user terminals from the base station, and perform corresponding operations and configurations according to the configuration information to control its own flight, wherein the cell selecting/accessing unit is further configured to performing cell selection or access for the one of the at least one cell selectively according to the indication information and the configuration information,
wherein the configuration information includes flight restriction information related to flying altitude and/or the flying speed of the aerial user terminal, and
wherein the configuration information further includes information related to at least one of intra-frequency cell reselection or handover and inter-frequency cell reselection or handover.

7. The aerial user terminal according to claim 6, wherein the indication information is information indicating whether a cell managed by the base station supports aerial user terminals, and is included in a broadcast channel transmitted by the base station.

8. The aerial user terminal according to claim 7, wherein the receiving unit is further configured to receive the configuration information related to aerial user terminals from the base station through the system information.

9. The aerial user terminal according to claim 6, wherein the indication information is a list indicating the at least one cell supporting aerial user terminals, and is included in system information transmitted by the base station.

10. The aerial user terminal according to claim 6, wherein the aerial user terminal is in a connected state, and the receiving unit is further configured to receive the configuration information related to aerial user terminals from the base station through radio resource control signaling.

11. A base station comprising:
a receiving unit configured to receive indication information indicating neighbor cells reported by a user terminal;
a maintaining unit configured to selectively maintain, according to whether the user terminal is an aerial user terminal, a neighbor relationship table according to the indication information; and
a transmitting unit configured to transmit configuration information related to aerial user terminals to the aerial user terminal for the aerial user terminal to perform corresponding operations and configurations according to the configuration information to control its own flight,
wherein the configuration information includes flight restriction information related to flying altitude and/or the flying speed of the aerial user terminal, and
wherein the configuration information further includes information related to at least one of intra-frequency cell reselection or handover and inter-frequency cell reselection or handover.

12. The base station according to claim 11, wherein when the user terminal is an aerial user terminal, the maintaining unit does not maintain the neighbor relationship table according to the neighbor cells indicated by the indication information.

13. The base station according to claim 11, wherein when the user terminal is an aerial user terminal, the maintaining unit maintains a neighbor relationship table dedicated to aerial user terminals, which is different from the neighbor relationship table according to the neighbor cells indicated by the indication information or neighbor cells that support aerial user terminals in the neighbor cells.

14. The base station according to claim 13, wherein when the user terminal is an aerial user terminal, the maintaining unit maintains the neighbor relationship table according to the neighbor cell indicated by the indication information or neighbor cells that support aerial user terminals in the neighbor cells, wherein in the neighbor relationship table, neighbor cells reported by aerial user terminals are distinguished from neighbor cells reported by user terminals that are not aerial user terminals.

* * * * *